(12) United States Patent
Gorst et al.

(10) Patent No.: US 7,987,593 B1
(45) Date of Patent: Aug. 2, 2011

(54) METHOD FOR GENERATING SELECTIVE CAPACITANCE VALUES

(75) Inventors: Malcolm Gorst, Newton Abbot (GB); Ronald E. Loving, Reno, NV (US)

(73) Assignee: Direct Brand Ltd., New Abbot (GB)

( * ) Notice: Subject to any disclaimer, the term of this patent is extended or adjusted under 35 U.S.C. 154(b) by 0 days.

(21) Appl. No.: 12/701,364

(22) Filed: Feb. 5, 2010

Related U.S. Application Data

(60) Provisional application No. 61/156,661, filed on Mar. 2, 2009, provisional application No. 61/156,713, filed on Mar. 2, 2009, provisional application No. 61/156,727, filed on Mar. 2, 2009.

(51) Int. Cl.
*H01R 43/00* (2006.01)

(52) U.S. Cl. .......... 29/857; 29/25.41; 29/25.42; 29/832; 29/846

(58) Field of Classification Search .......... 29/857, 29/25.41, 25.42, 832, 846, 876; 361/272, 361/274.1, 275.3, 301.1, 301.3, 301.5, 328, 361/329

See application file for complete search history.

(56) References Cited

U.S. PATENT DOCUMENTS

| | | | |
|---|---|---|---|
| 7,203,053 B2 * | 4/2007 | Stockman | 361/301.5 |
| 7,365,959 B1 | 4/2008 | Ward | |
| 7,848,079 B1 * | 12/2010 | Gordin et al. | 361/328 |

\* cited by examiner

*Primary Examiner* — Thiem Phan
(74) *Attorney, Agent, or Firm* — Buskop Law Group, PC; Wendy Buskop

(57) ABSTRACT

A method for generating a multiplicity of capacitance values is described herein. The method can include lining a housing with an insulating layer to form a lined housing. Wires can be connected to terminals of capacitors to form a collective connection. The collective connection can be connected to a fuse to form a wired bundle, which can be disposed within the housing. A resin can be poured into the housing to form an expansion chamber. A common terminal and auxiliary terminals can be disposed within a cap, which can have an insulating spider. An interrupter can also be secured to the cap. The method can include connecting each positive wire to one of the auxiliary terminals and connecting the fuse to the common terminal. A lip of the cap can be deformed around the housing for securing the cap to the housing, forming a bundled capacitor.

10 Claims, 11 Drawing Sheets

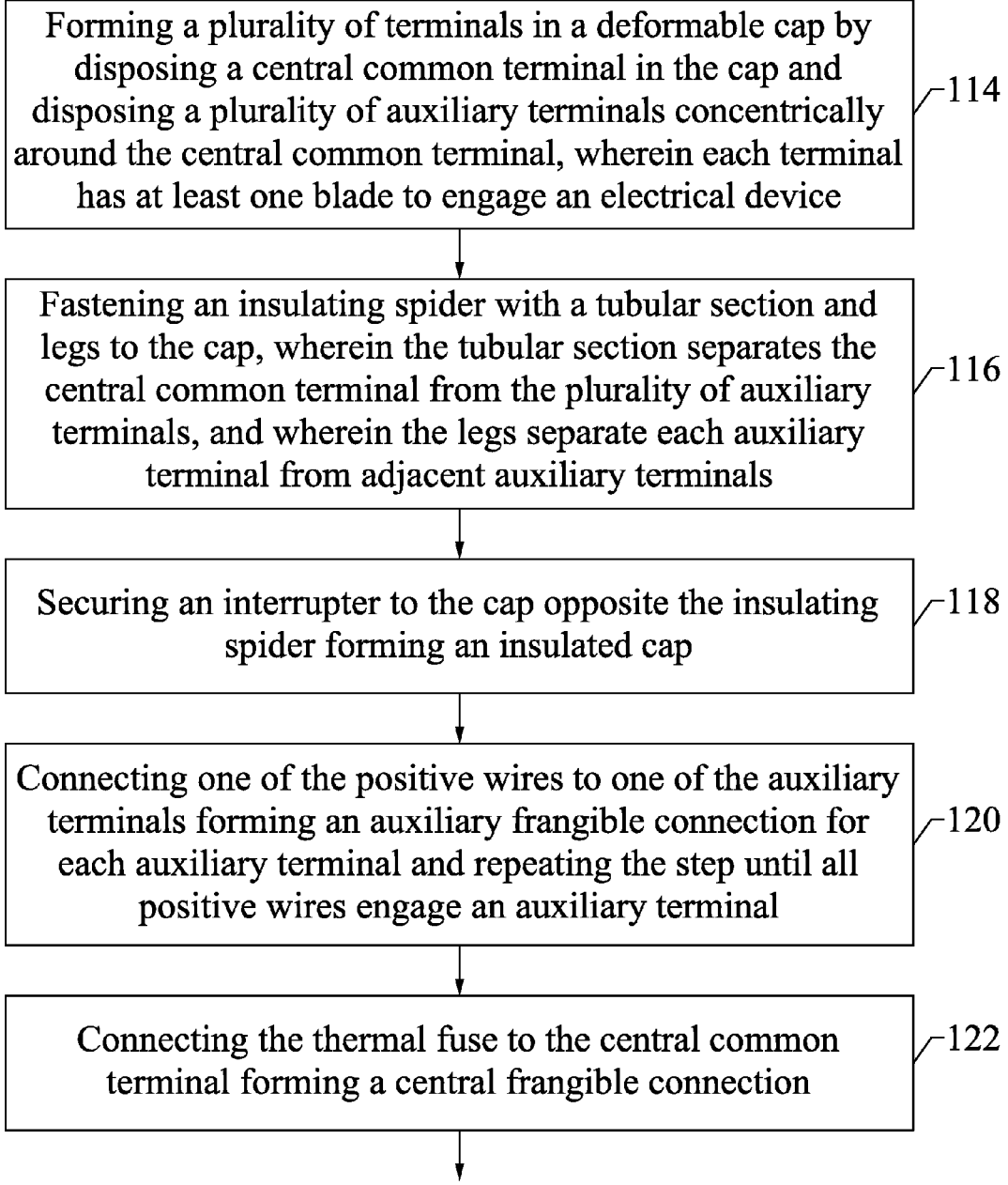

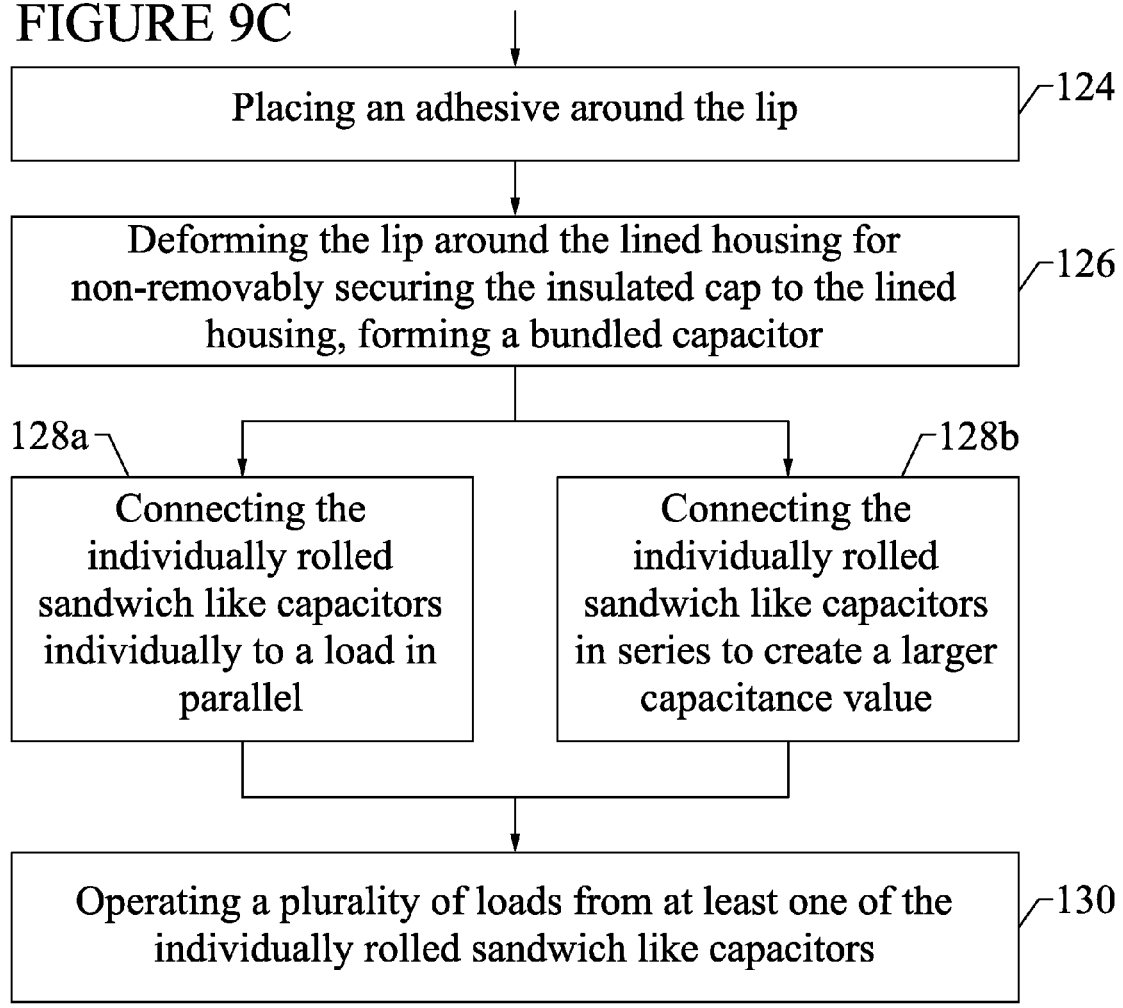

METHOD FOR GENERATING SELECTIVE CAPACITANCE VALUES

CROSS REFERENCE TO RELATED APPLICATIONS

The present application claims priority and the benefit of co-pending U.S. Provisional Patent Application Ser. No. 61/156,661 filed on Mar. 2, 2009, co-pending U.S. Provisional Patent Application Ser. No. 61/156,713 filed on Mar. 2, 2009, and co-pending U.S. Provisional Patent Application Ser. No. 61/156,727 filed on Mar. 2, 2009. These references are hereby incorporated in their entirety.

FIELD

The present embodiments generally relate to a method for generating selective capacitance values. The method can be more reliable and more versatile than other methods and can use a unique bundled capacitor made from a plurality of wound individual capacitors that can be connectable to match needed capacitance for a load.

BACKGROUND

A need exists for a method to provide selective capacitance values for a variety of single phase motors for air conditioning systems or other devices.

A single service person can visit many various sized air conditioners for servicing during any given week. A need exists for a method for a service person or another person to provide selective capacitance to a wide variety of motors using a single device.

A need exists for a method to provide selected capacitance values that can use a single device that has low maintenance requirements.

The present invention meets these needs.

BRIEF DESCRIPTION OF THE DRAWINGS

The detailed description will be better understood in conjunction with the accompanying drawings as follows:

FIG. 9B depicts a continuation of the flow chart of FIG. 9A.
FIG. 9C depicts a continuation of the flow chart of FIG. 9B.

Figure 1:
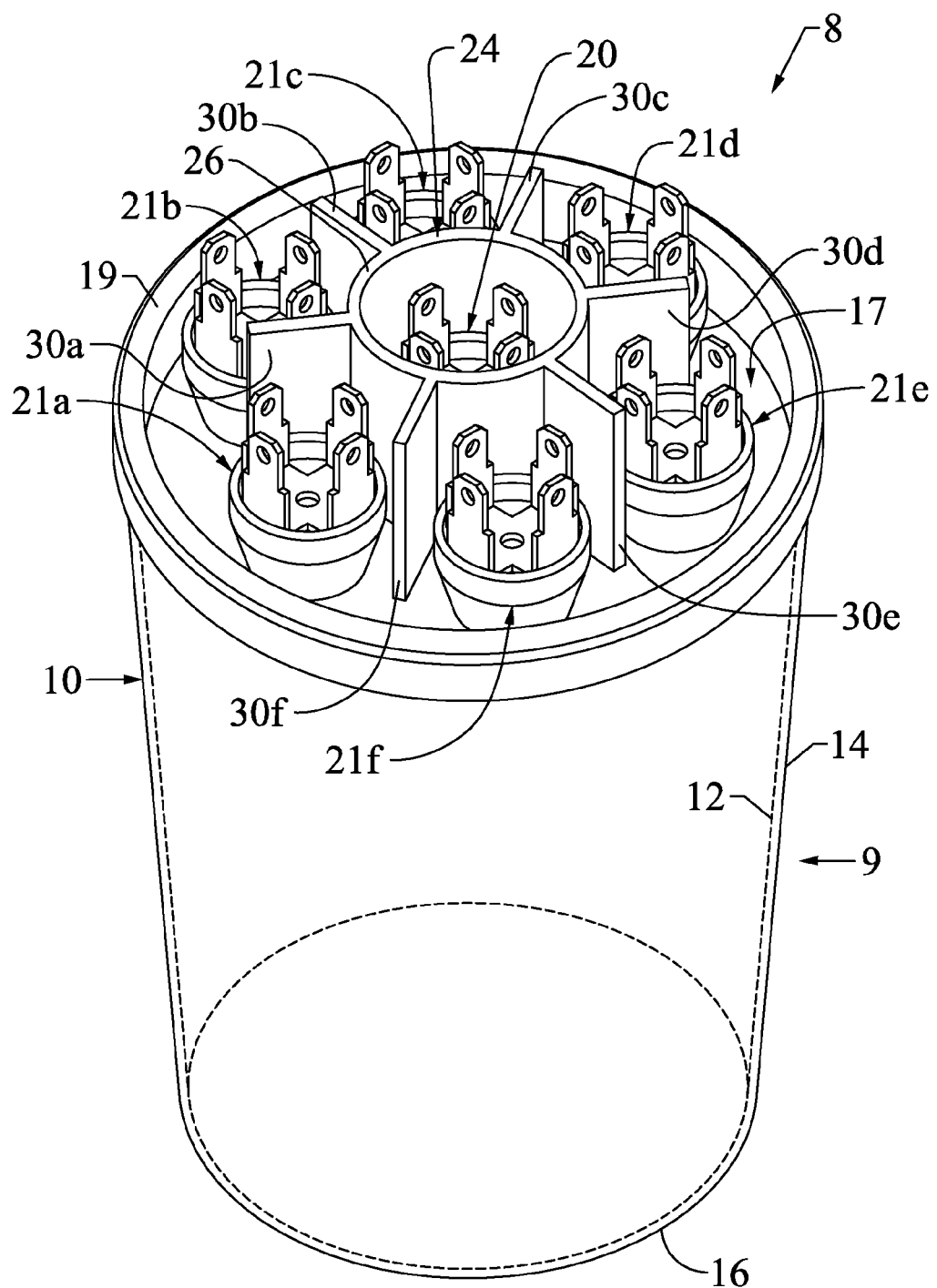
FIG. 1 is a view of a bundled capacitor.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method to provide selective capacitance to a single phase motor, such as an air conditioning or HVAC motor, by using a bundled capacitor with a plurality of individual rolled sandwich like capacitors connected together. The bundled capacitor can continue to operate when one of the individually rolled sandwich like capacitors fails to operate, in-part because the bundled capacitor can include more than one individual capacitor.

During any given week a single service person can service many various sized air conditioning units or other devices that have single phase motors. Embodiments of the present invention can allow a single service person to provide maintenance, repair, and service to a wide variety of motors by using a single device.

One or more embodiments can include a method for generating multiple capacitance values using the bundled capacitor. The method can include lining a housing, such as with an insulating layer, and forming a lined housing. The lining can be an insulating layer such as paper. Multiple individual capacitors can be contained within the housing. The housing can have walls, a first integral bottom, and an open top.

Electrical communication can be provided between a negative wire and each negative terminal of each capacitor of the plurality of individual capacitors that can be inserted into the lined housing.

In one or more embodiments, the negative wires can be connected together, or can otherwise be in electrical communication to form a collective connection, and the collective connection can be in electrical communication with a single thermal fuse, which forms a wired bundle.

In one or more alternative embodiments, the negative wires can each be in electrical communication with a different thermal fuse, which forms a wired bundle.

The method can include providing electrical communication between positive wires and each positive terminal of each of the plurality of individual capacitors.

The wired bundle can be placed or otherwise disposed into the lined housing.

The method can involve flowing a resin into the housing, which covers the individual capacitors of the wired bundle. In one or more embodiments, the resin can cover the thermal fuse or thermal fuses. In other embodiments, the thermal fuses can be located above the resin within an expansion chamber of the bundled capacitor.

In one or more embodiments, the resin can partially fill the housing, and the portion of the housing not filled with the resin can form the expansion chamber in the housing.

The resin can be an insulating, fast curing, and strong resin that can firmly hold the capacitors within the housing without substantially moving within the housing. Holding or surrounding the capacitors with the resin can allow the capacitors to be resistant to breakage, oxidation, and damage due to the secure manner in which the capacitors can be held within the housing by using the resin.

After allowing the resin to cure, or during the curing of the resin, a material can be added on top of the resin. The material can be the insulating layer, which can form a layer between the resin and the expansion chamber and can cover each of the individual capacitors.

After or during the curing of the resin, a plurality of terminals can be disposed in or through a cap of the bundled capacitor. The cap can be a deformable cap.

The method can involve creating a central common terminal. The central common terminal can be disposed or secured to or through a body portion of the deformable cap, such as by using a rivet or a similar fastener. The central common terminal can include at least one blade.

A plurality of auxiliary terminals can be formed or disposed on or through the cap. The auxiliary terminals can be concentrically disposed around the central common terminal. Each auxiliary terminal can include at least one blade. The blade or blades can be adapted to engage an electrical device, a motor, or to connect to a load.

Next, an insulating spider can be disposed or fastened to the deformable cap. The insulating spider can be connected to the cap on the side of the cap that is opposite the housing.

The deformable cap can have a lip and the insulating spider can be placed on the cap within the perimeter of the lip.

The insulating spider can be a one piece molded unit of insulating material, such as plastic. The insulating spider can further include a tubular member with legs, and can include from 1 leg to 8 legs. The legs can be disposed about a circumference of the tubular member and can each extend outwards from the tubular member.

The legs of the spider can provide separation between an auxiliary terminal and an adjacent auxiliary terminal, while the tubular section of the spider can provide separation between each auxiliary terminal and the central common terminal. The central common terminal can be disposed within a central annulus of the tubular member.

An interrupter can be disposed on or secured to the deformable cap on the side of the cap opposite the insulating spider, which forms an insulated deformable cap. Holes can be drilled into the interrupter. Connections from each of the terminals can be disposed and extended through the drilled holes in the interrupter.

Each of the positive wires can be connected, or otherwise in electrical communication with one of the auxiliary terminal connections disposed through the interrupter, forming an auxiliary frangible connection for each auxiliary terminal.

Electrical communication can be provided between each thermal fuse and the central common terminal through by disposing the central common terminal through the interrupter, which forms a central frangible connection.

An adhesive can be disposed between the cap and the housing body. In one or more embodiments, the adhesive can be disposed around the lip. The lip can be crimped, deformably disposed, or otherwise disposed around the housing body, which forms a non-removable deformable cap over the housing. The adhesive can be a silicon based adhesive and can be applied in a layer from about 0.0001 millimeters to about 1.0 millimeters.

The method can include individually connecting each capacitor to a load in parallel.

The method can also include connecting the individually rolled sandwich like capacitors in series to create a larger capacitance value.

The method can further include operating a plurality of loads from one or more of the individually rolled sandwich like capacitors.

The method can insure that two different forms of fail safe are used on the bundled capacitor.

A plurality of capacitors can be used in the bundled capacitor. In one or more embodiments, from about 1 capacitor to about 8 capacitors can be used in the bundled capacitor. The plurality of capacitors can be connected together through a central common terminal of the bundled capacitor.

Each capacitor can provide an individual capacitance value. For example, for a bundled capacitor with a capacitance of 30 microfarads, each individual capacitor can have a capacitance of 5 microfarads.

In one or more embodiments, the bundled capacitor can be used for single phase motors that require a capacitance from about 0.005 microfarads to about 300 microfarads.

The bundled capacitor can have a housing that can be made from graphite composite, reinforced polypropylene, polyethylene, aluminum, aluminum alloys, stainless steel, plated mild steel, another material, or combinations thereof. In one or more embodiments, the housing can be formed of a strong, non-brittle, and non-deformable material.

The housing can have a housing body, an interior side and an exterior side.

The housing can be cylindrical or another geometric shape as needed for the particular application. The housing can have sides and a first integral end.

In one or more embodiments, the thickness of the sides and of the first integral end of the housing can be from about 0.005 millimeters to about 2 millimeters.

In one or more embodiments, the housing can have reinforcing ribs. The reinforcing ribs can enable the housing to maintain a shape and can prevent the housing from becoming perforated, cracked, or otherwise damaged if one of the individual capacitors overheats or explodes.

In one or more embodiments, the overall length and the outer diameter of the housing can be from about 20 millimeters to about 500 millimeters.

The housing can have an indicator light and a test plug to allow a person, such as an HVAC serviceman, to test that the bundled capacitor or an individual capacitor is still functioning or to check if the selective capacitance value is still being provided. The selective capacitance value can be from about 0.005 microfarads to about 500 microfarads.

In one or more embodiments, the housing can be closed with a cap. The cap can be hermetically sealable, deformable, or combinations thereof.

The cap can have a thickness of from about 0.005 millimeters to about 500 millimeters and can have a diameter slightly larger than the housing body.

The cap can include a body and a lip. The cap body can be an expandable body.

The expandable body can provide safety to a user of the bundled capacitor. The expandable body can allow the cap to expand away from the housing body. For example, if one of the individual capacitors of the bundled capacitor overheats or explodes, the expandable body can allow the cap to expand away from the housing body while still maintaining the cap in engagement with the housing and without allowing anything to exit the housing. The cap can thereby protect a user from any debris associated with an overheating or exploding capacitor.

The cap can be attached or otherwise connected to the housing on an end of the housing body which is opposite from the first integral end.

The cap lip can be from about 0.005 millimeters to about 50 millimeters in width. In one or more embodiments, the lip can be crimped over edges of the housing body, which forms a non-removable cap. A central common terminal can be disposed through or on the cap. The central common terminal can be centrally disposed through the cap.

The central common terminal can include at least one blade. In one or more embodiments, the central common terminal can include from about 1 blade to about 4 blades.

The central common terminal can include a fastener, which can be a rivet, for holding the central common terminal to the cap. The fastener can be disposed on the central common terminal.

The central common terminal, or a wire engaged with the central common terminal, can engage a frangible connection within the housing body. Blades of the central common terminal can also connect to a connector that can engage an external load that is not part of the bundled capacitor.

The plurality of auxiliary terminals can also be disposed on or through the cap. Each auxiliary terminal, or a wire engaged with each auxiliary terminal, can engage a frangible connection within the housing body. Each auxiliary terminal can be formed the same as the central common terminal in that it can have the same kind and size of blades. Blades of each auxiliary terminal can engage external loads.

The bundled capacitor can include an interrupter. In one or more embodiments, the interrupter can be secured to the cap on the side of the cap that is connected to the housing body. The interrupter can be made of an insulating material such as rubber, plastic, or an elastomeric insulating material.

The central common terminal and each of the auxiliary terminals can pass through the interrupter to engage the frangible connections. The interrupter can ensure good insulation and can improve safety, such as when overheating of the bundled capacitor occurs.

The interrupter can have a diameter that is slightly less than the diameter of the cap, and can have a thickness from about 0.002 millimeters to about 15 millimeters.

The terminals can be disposed through holes which can be disposed in the interrupter. The holes can be drilled into the interrupter and can be disposed from about 2 millimeters to about 10 millimeters apart. In one or more embodiments, the holes can be disposed in the interrupter in a concentric manner, and an additional hole can be centrally disposed in the interrupter for the central common terminal.

The interrupter can have an inner part which can be made of plastic, Mylar™, or another material. The interrupter can have an outer part which can be made of an insulating material, a thermoplastic, Nylon™, or another material.

Each interrupter can have at least one spacer per terminal. The spacers can be donut shaped, shaped like two cones joined together, a frusto-conical shape, or another shape. The spacers can have a thickness from about 0.1 millimeter to about 22 millimeters, a length of from about 1.5 millimeters to about 30 millimeters, and a width of from about 1.65 millimeters and to about 25.7 millimeters.

The spacers can be perforated, laminated, reinforced, or combinations thereof. A fastener can be used to connect the spacers, such as a rivet.

A plurality of individual rolled sandwich like connected capacitors can be disposed within the bundled capacitor housing.

In one or more embodiments, the bundled capacitor can include at least three and up to 50 capacitors. Each capacitor can be a fully separate and fully functioning capacitor. When the capacitors are connected together, the capacitors can form the bundled capacitor with selective capacitance values.

Each individual capacitor can have an individual capacitance, such as from about 0.5 microfarads to about 100 microfarads. Each individual capacitor can have a different individual capacitance based upon the particular uses of the bundled capacitor. In one or more embodiments, more than one individual capacitor of a bundled capacitor can have the same capacitance.

Each individual capacitor can have a positive terminal and a negative terminal. The negative terminals of the plurality of capacitors can be electrically connected together, which forms an insulated collective connection. The insulated collective connection can be electrically connected to at least one thermal fuse, which can in-turn be electrically connected to the frangible connection in communication with the central common terminal.

In one or more embodiments, each negative terminal of a capacitor can be directly connected to an individual thermal fuse, and a single connection from the fuse can connect to the frangible connection in communication with the central common terminal.

Thermal fuses usable herein can include those made by NEC, such as NEC model number 105-72500-1.

The thermal fuses can provide the benefit of greater safety for a user of the bundled capacitor. In one or more embodiments, the use of thermal fuses can provide an instantaneous solution to overheating of an individual capacitor. Two or more thermal fuses can be connected together in parallel to provide the benefit of being able to maintain the rest of the individual capacitors when one of the individual capacitors fails to function. The thermal fuses can be disposed between the collective connection and the central common terminal.

The insulating layer can encapsulate any metal portions or conductive portions of the interior of the housing body, which provides for safety and for a lower likelihood of the bundled capacitor to short out. The insulating layer can provide a form of cathodic protection for the bundled capacitor. The insulating layer can enable the bundled capacitor to function at a cooler temperature, which produces less heat. Therefore, the bundled capacitor can be more reliable than other capacitors by at least about 15 percent.

The insulating layer can be made from a flame retardant material such as a coated webbed material or a plasticized non-woven paper and can have a thickness from about 0.002 to about 0.7 millimeters.

In one or more embodiments, the insulating layer can cover only about ¾ of the interior of the housing, which saves money.

The insulating layer can be applied by sputtering, microdeposition, hand laying, by dipping of the housing into a bath of the insulating layer material, or by another means.

When the individual capacitors are disposed within the housing, a resin can disposed around the individual capacitors. The resin can secure the individual capacitors to the first integral end, to the insulating layer, and can cover the individual capacitors of the bundled capacitor.

In one or more embodiments, the resin does not completely fill the housing body, which allows for space for the bundled capacitor to have an expansion chamber.

The resin can be a blend of resins that have different physical properties. For example, a resin, such as polyurethane can have anti-static properties and can be blended with a dried insulating gas that can have impact resistance properties. The blended resins can be blended in various ratios, such as 8 to 1.

The resin can be made of 100 percent epoxy resin. In one or more embodiments, the resin can be a fast curing resin, such as an advanced epoxy resin insulating material which can provide an unexpected benefit of being more lightweight than other types of fluid-filled or oil-filled capacitors. For example, the resin can be Axson RE 22801/RE 2120. In one or more embodiments, the resin can be an insulating and flame retarding resin.

By disposing the resin around the individual capacitors, the bundled capacitor can have increased strength. Use of the resin can prevent environmental damage that can be caused by oil leaks, such as when an internal component explodes or when a component not related to the bundled capacitor punctures the housing, such as a forklift prong. The resin can allow the bundled capacitor to be more safely handled by users give the strength and leakage protection that it provides.

The insulating layer can be disposed over the resin that can be used to fill the housing, which provides an encapsulated version of the capacitors of the bundled capacitor.

The resin can rigidly support and connect the plurality of individual rolled sandwich like connected capacitors to the first integral end and to the insulating layer. In one or more embodiments, the resin can connect the plurality of individual rolled sandwich like connected capacitors to at least 80 percent of the insulating layer.

In one or more embodiments, an insulating oil can be used in place of the resin.

The resin can provide a unique advantage of improved stability and improved heat dissipation, providing a safer product.

An expansion chamber can be formed in the housing body and can be disposed between the resin and the interrupter, which enables the cap to have a space for heated air to expand within. The expansion chamber can provide a space for heated air to expand, which allows the cap to deform when one or more of the individual capacitors overheats, providing a fail safe feature. The expansion chamber can allow the cap to deform without disengaging the cap from the housing body.

Fail safe features of the bundled capacitor can include the expansion chamber, the deformable body of the cap, the frangible connections, and the thermal fuse. Also, use of the resin provides recyclability, increased reliability of the bundled capacitor if the bundled capacitor is impacted, and an environmental advantage in that the bundled capacitor does not have to use "oil" which can be an environmental toxic hazard.

Turning now to the Figures, FIG. 1 shows a bundled capacitor 8 with a housing 9 with an open top. The housing 9 is shown with a housing body 10 and a first integral end 16, which can be connected to walls of the housing body 10. The housing 9 is shown having an interior side 12 and an exterior side 14.

A cap 17 can be connected to the open top of the housing 9. A central common terminal 20 can be disposed in the center of the cap 17. The cap 17 can also include a lip 19, which can engage the edges of the open top of the housing 9.

A plurality of auxiliary terminals can be concentrically disposed around the central common terminal 20. In the embodiment depicted, six auxiliary terminals are shown as auxiliary terminals 21a, 21b, 21c, 21d, 21e, and 21f.

The bundled capacitor 8 can include an insulating spider 24 having a tubular section 26 and legs 30a, 30b, 30c, 30d, 30e, and 30f.

The tubular section 26 can have a central annulus surrounding the central common terminal 20 and separating the auxiliary terminals from the central common terminal 20. The legs 30a, 30b, 30c, 30d, 30e, and 30f can extend from the tubular section 26 separating each auxiliary terminal from adjacent auxiliary terminals.

The legs 30a, 30b, 30c, 30d, 30e, and 30f can be made from a thermoplastic, such as a nylon blend available from I.E. DuPont of Wilmington, Del. The legs can have a thickness of about 0.25 millimeters.

The tubular section 26 can have a diameter of about 15 millimeters and each leg can be about 35 millimeters long. The insulating spider 24 can be made from an insulating material.

Figure 2:
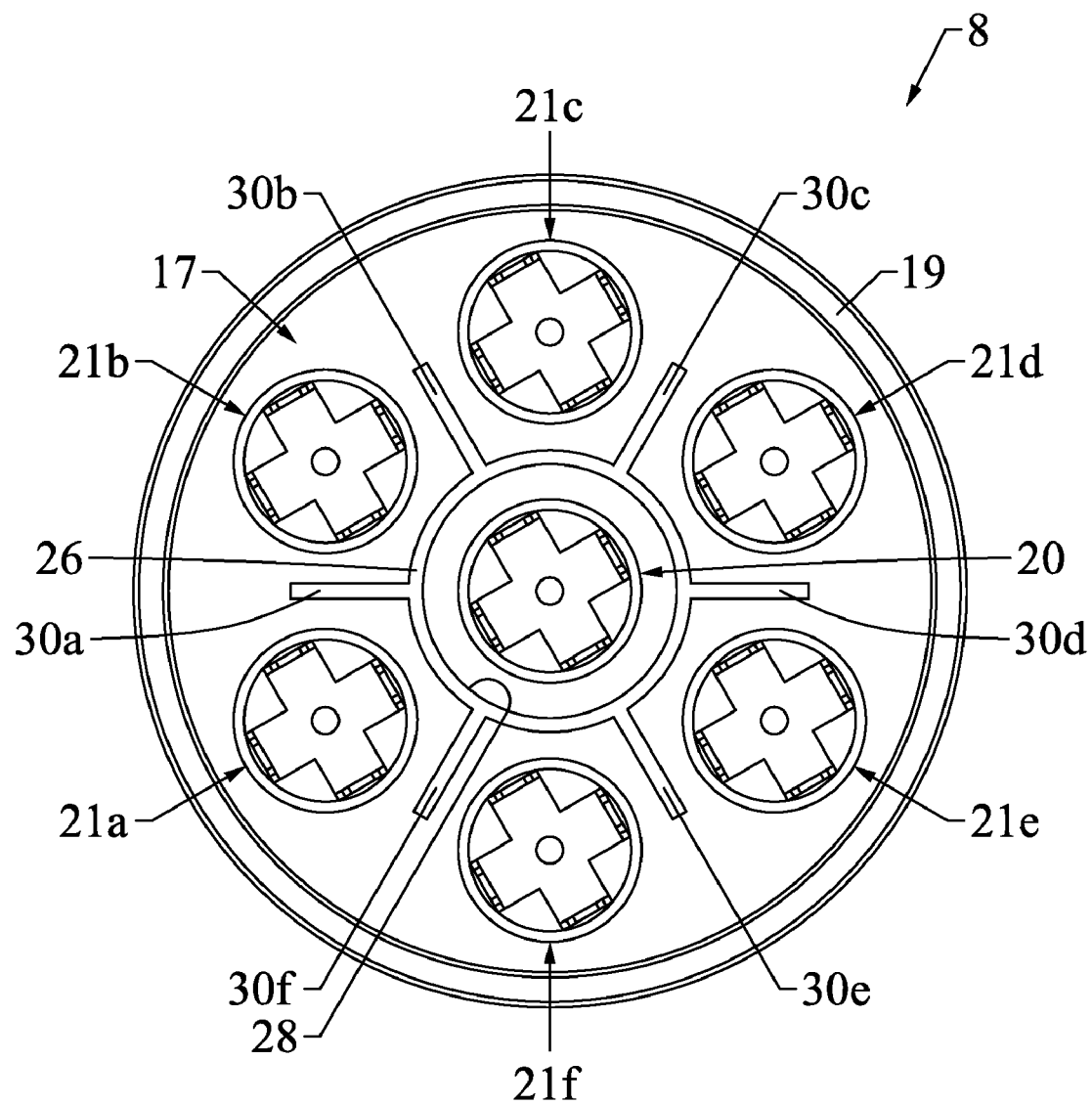
FIG. 2 is a top view of a bundled capacitor.

FIG. 2 is a top view of the bundled capacitor 8 with the cap 17, which can be connected to the housing on the opposite side of the housing body from the first integral end. The cap 17 is shown with the lip 19.

Each of the six auxiliary terminals 21a, 21b, 21c, 21d, 21e, and 21f are shown equally spaced around the cap 17 and separated by legs 30a, 30b, 30c, 30d, 30e, and 30f. The central common terminal 20 can be centrally disposed within a central annulus 28 of the tubular section 26 on the cap 17.

Figure 3A:
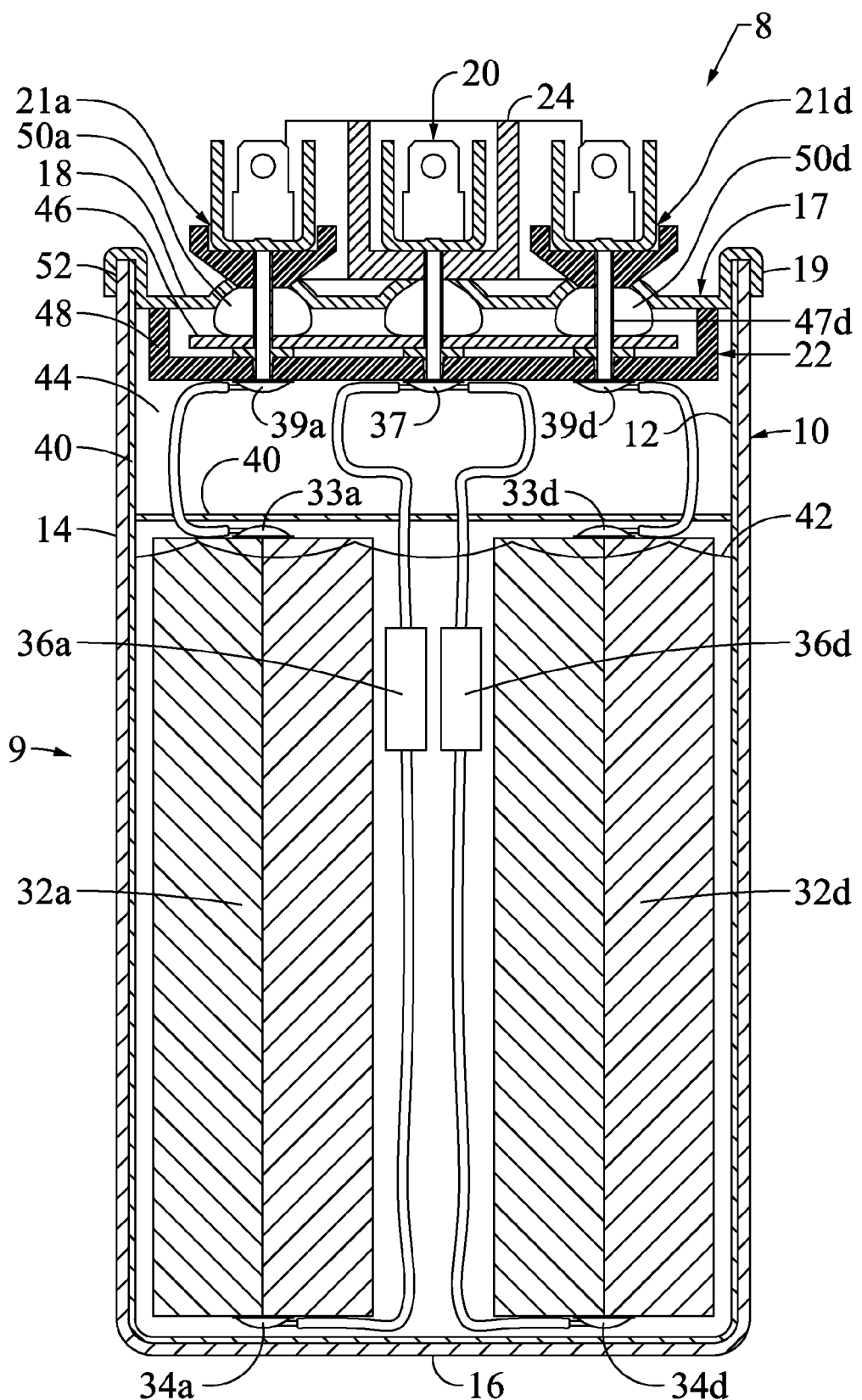
FIG. 3A is a cross sectional view of an embodiment of the bundled capacitor.

FIG. 3A shows a detailed cross section of the bundled capacitor 8 that has the housing 9 with an open top, the housing body 10, and the first integral end 16 connected to the walls of the housing body 10. The housing 9 can have an interior side 12 and an exterior side 14.

Auxiliary terminals 21a and 21d as well as the central common terminal 20 are shown separated by the insulating spider 24.

Two individual rolled sandwich like connected capacitors 32a and 32d are shown within the housing 9. Each individual rolled sandwich like connected capacitor 32a and 32d can have a positive terminal 33a and 33d and a negative terminal 34a and 34d opposite the positive terminal 33a and 33d.

Each of the negative terminals 34a and 34d can connect with a thermal fuse 36a and 36d.

The thermal fuses 36a and 36d can connect, such as by wiring, to a frangible electrical connection 37 that can be located on the bottom of an interrupter 22 between the thermal fuses 36a and 36d and the central common terminal 20. The frangible electrical connection 37 can connect to both thermal fuses 36a and 36d as well as the central common terminal 20.

The interrupter 22 can be disposed on the expandable body 18 of the cap 17 and can extend towards and/or within the housing body 10. The interrupter 22 can engage each of the auxiliary terminals and can include an inner part 46, an outer part 48, and at least one spacer 50a and 50d for each terminal. The spacers 50a and 50d can provide insulation between the cap 17 and the housing 9. The spacers 50a and 50d can be connected to the cap 17 with fasteners, such as rivets. Fastener 47d is shown. The fasteners can join and connect the auxiliary terminals 21a and 21d to the frangible electrical connections 39a and 39d, which prevents arcing and other safety hazards.

The inner part 46 and the outer part 48 of the interrupter 22 can be laminated together.

The bundled capacitor 8 can have an insulating layer 40 that can line the interior 12 of the housing 9 as well as the top and bottom of a resin 42. The resin 42 can encapsulate the individual capacitors of the bundled capacitor 8.

The resin 42 can be flowed around the capacitors 32a and 32d within the housing body 10, which seals the capacitors to the insulating layer 40 and to the first integral end 16. The resin 42 can connect the capacitors 32a and 32d to the first integral end and to at least about 80% of the insulating layer 40.

An expansion chamber 44 can be formed and disposed between the cap 17 and the individual capacitors 32a and 32d. The expansion chamber 44 can be formed between the resin 42 and the interrupter 22, which enables the cap 17 to deform when an individual capacitor overheats in the bundled capacitor 8. The thermal fuses 36a and 36d can be located within the resin 42 or can be located above the resin 42.

The cap 17 can have a lip 19 that can be crimped around an outside of the housing body 10. The expandable body 18 of the cap 17 can be integrally connected to the lip 19.

The bundled capacitor 8 can include an adhesive 52, which can be disposed between the cap 17 and the housing body 10 for providing a secure engagement between the cap and the housing body.

Figure 3B:
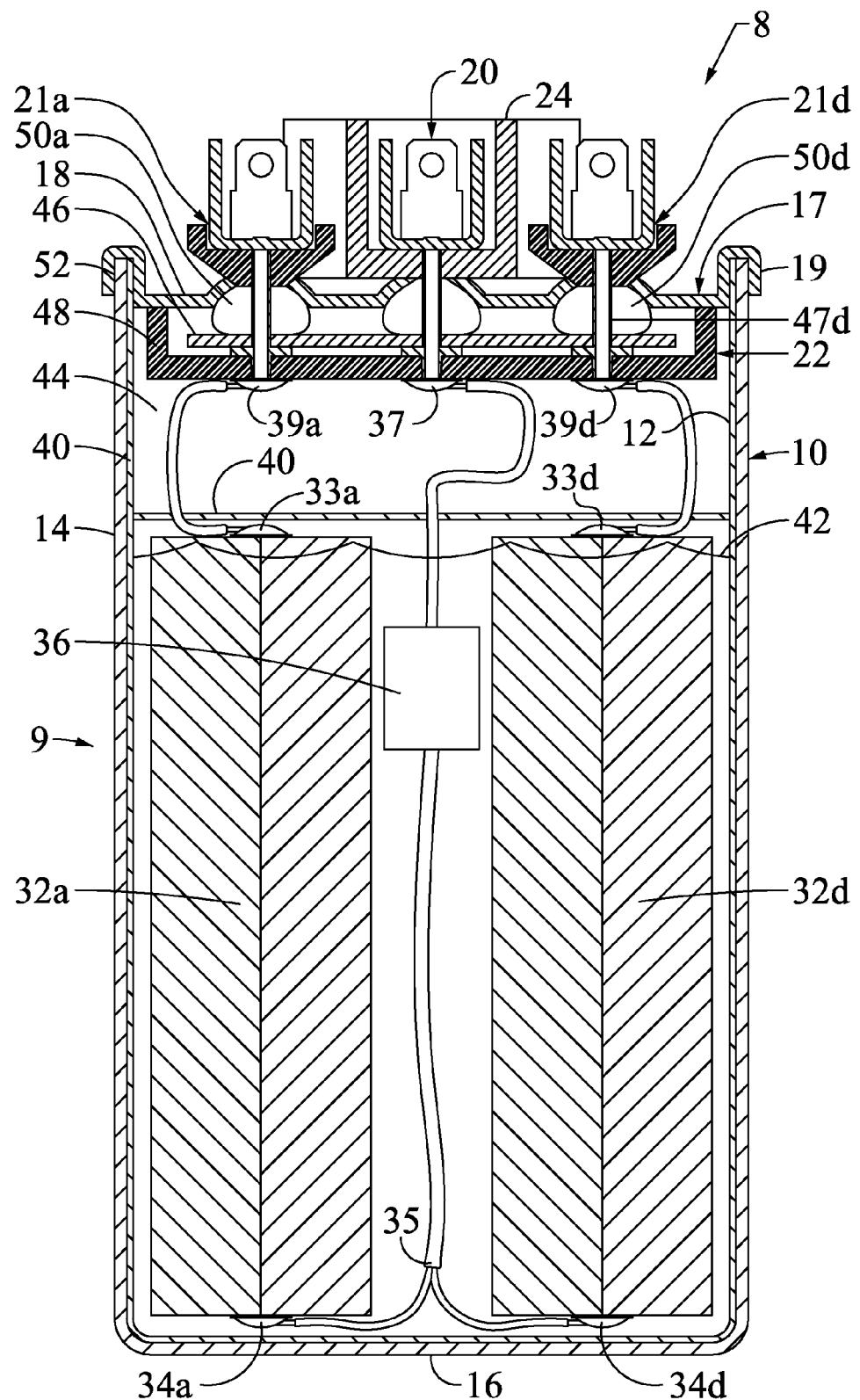
FIG. 3B is a cross sectional view of another embodiment of the bundled capacitor.

FIG. 3B shows another embodiment of the bundled capacitor 8.

Each of the negative terminals 34a and 34d can connect together to form an insulated collective connection 35 that can communicate with a single thermal fuse 36.

Also shown is the housing 9, the housing body 10, the first integral end 16, the interior side 12, the exterior side 14, the auxiliary terminals 21a and 21d, the central common terminal 20, the insulating spider 24, the capacitors 32a and 32d, the positive terminals 33a and 33d, the frangible electrical connection 37, the interrupter 22, the expandable body 18, the inner part 46, the outer part 48, the spacers 50a and 50d, the fastener 47d, the frangible electrical connections 39a and 39d, the insulating layer 40, the resin 42, the expansion chamber 44, the cap 17, the lip 19, and the adhesive 52.

Figure 4:
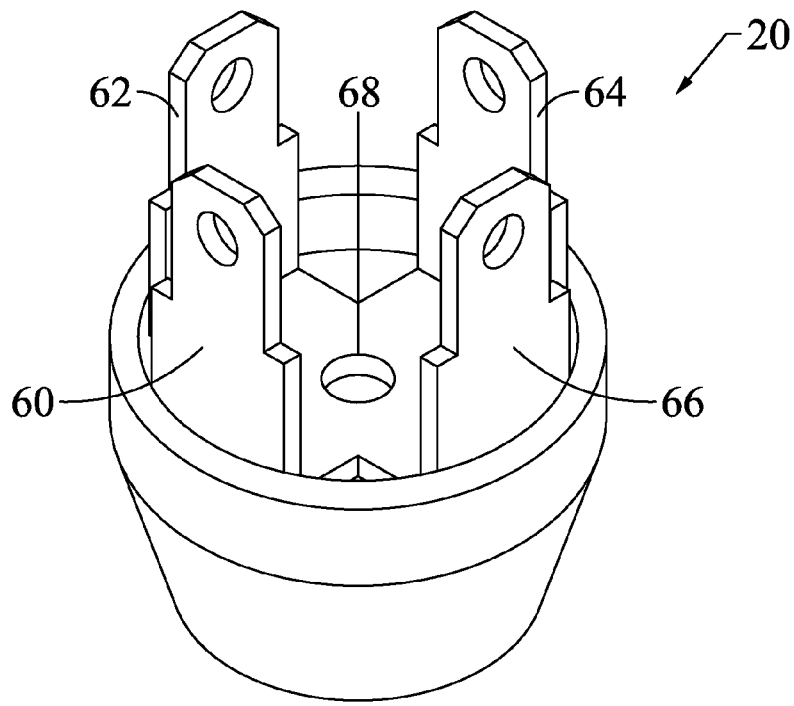
FIG. 4 is a detail of a central common terminal and a cap.

FIG. 4 shows a detail of the central common terminal 20. The central common terminal can have four blades 60, 62, 64, and 66, as well as a rivet hole 68. The fastener can engage the rivet hole.

Figure 5:
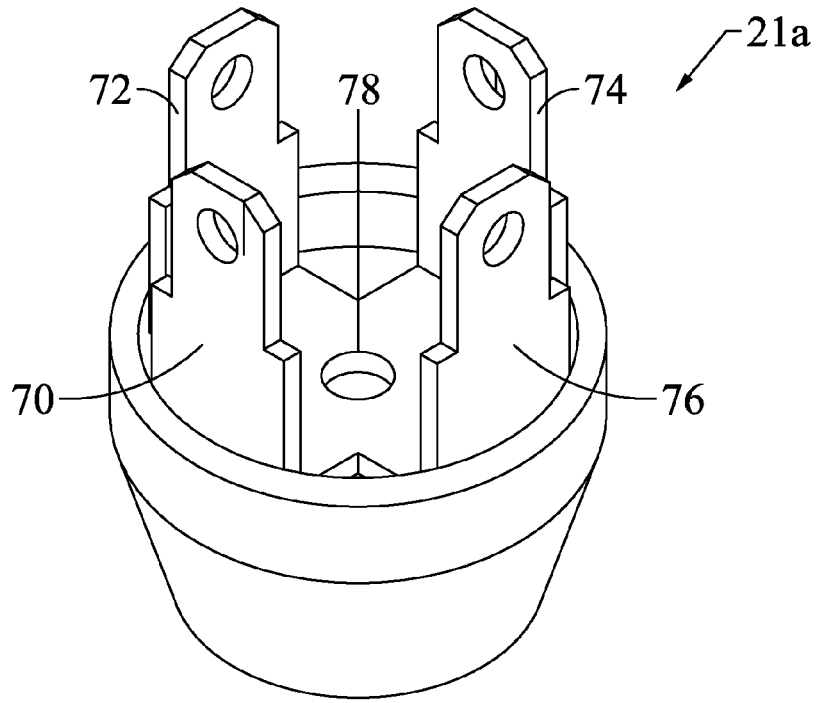
FIG. 5 is a detail of an auxiliary terminal.

FIG. 5 shows a detail of one of the auxiliary terminals 21a. This auxiliary terminal can have four blades 70, 72, 74, and 76, as well as a rivet hole 78, which can be engaged by a fastener.

The blades of the auxiliary terminals or central common terminals can provide an electrical connection between the bundled capacitor and a motor, such as a single phase motor similar to one used in an air conditioning unit.

Uniquely, one or more embodiments can allow connection of the bundled capacitor to multiple single phase motors simultaneously, which saves time and money in comparison to using multiple individual capacitors. The bundled capacitor can thereby provide multiple and variable capacitance. The auxiliary terminals can allow the individual capacitors to connect together, such as in series, which allows a user to select individual capacitances.

Figure 6:
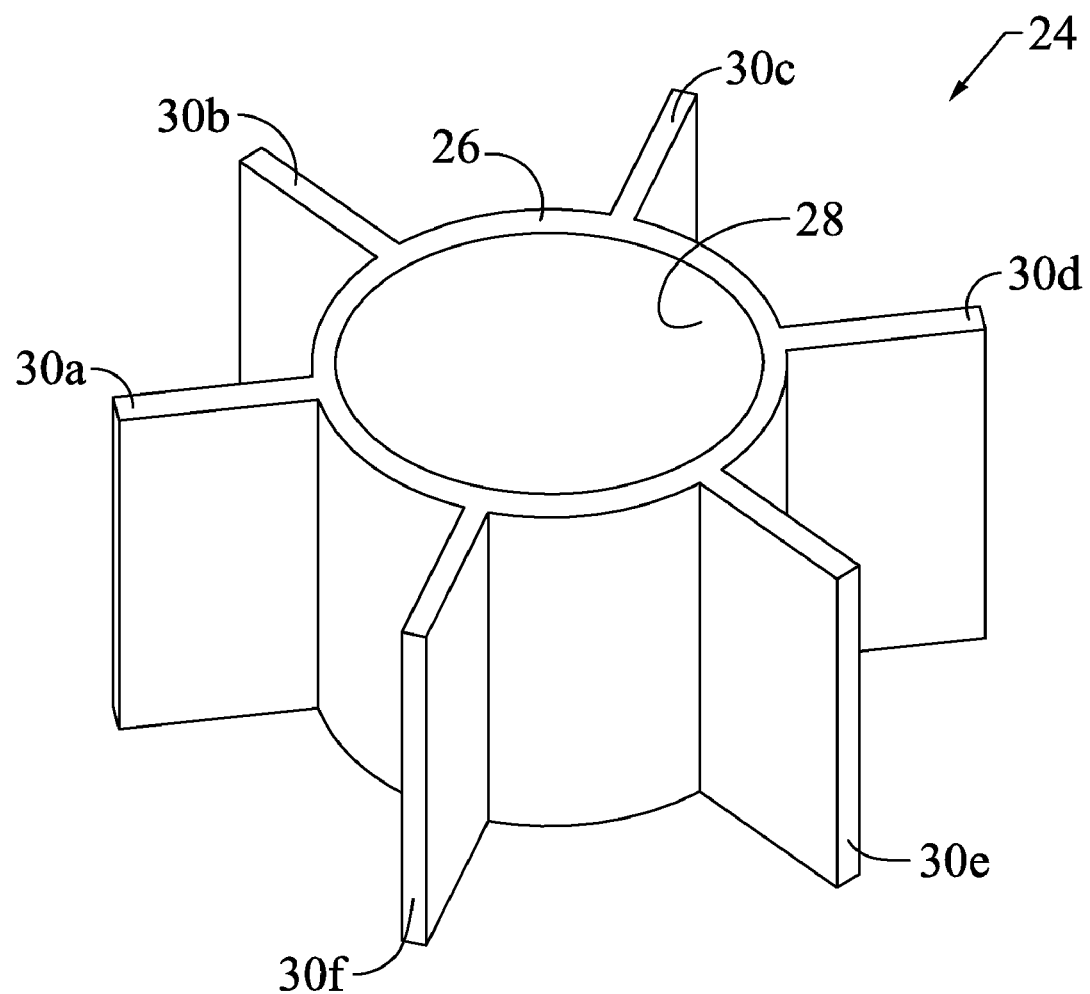
FIG. 6 shows an insulating spider.

FIG. 6 shows the insulating spider 24 having six legs 30a, 30b, 30c, 30d, 30e, and 30f. The insulating spider 24 is also shown having a central tubular section 26 with a central annulus 28. In one or more embodiments, the insulating spider 24 can include from one leg to eight legs. The insulating spider can also have more than eight legs.

Figure 7:
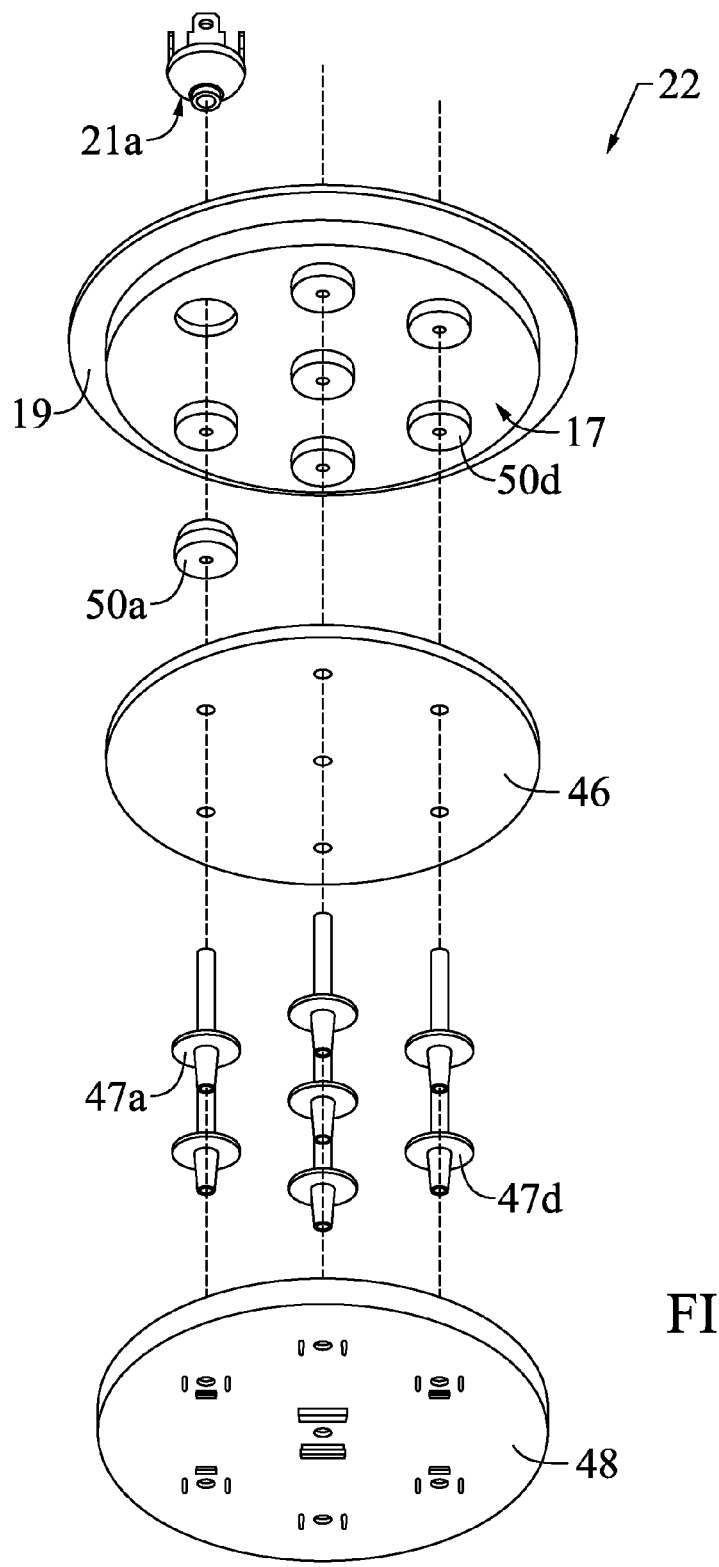
FIG. 7 is a detailed view of an interrupter.

FIG. 7 shows an exploded view of the interrupter 22 that has an inner part 46, an outer part 48, and spacers 50a and 50d. The spacers 50a and 50d can provide for spacing the inner part 46 from the cap 17.

The lip 19 is depicted disposed on the outer circumference of the cap 17.

Auxiliary terminal 21a is also shown. Fasteners 47a and 47d can connect through the inner part 46, each of the spacers 50a and 50d, the cap 17, and the outer part 48, which provides a fastening engagement. The fasteners can be rivets or bolts.

Figure 8:
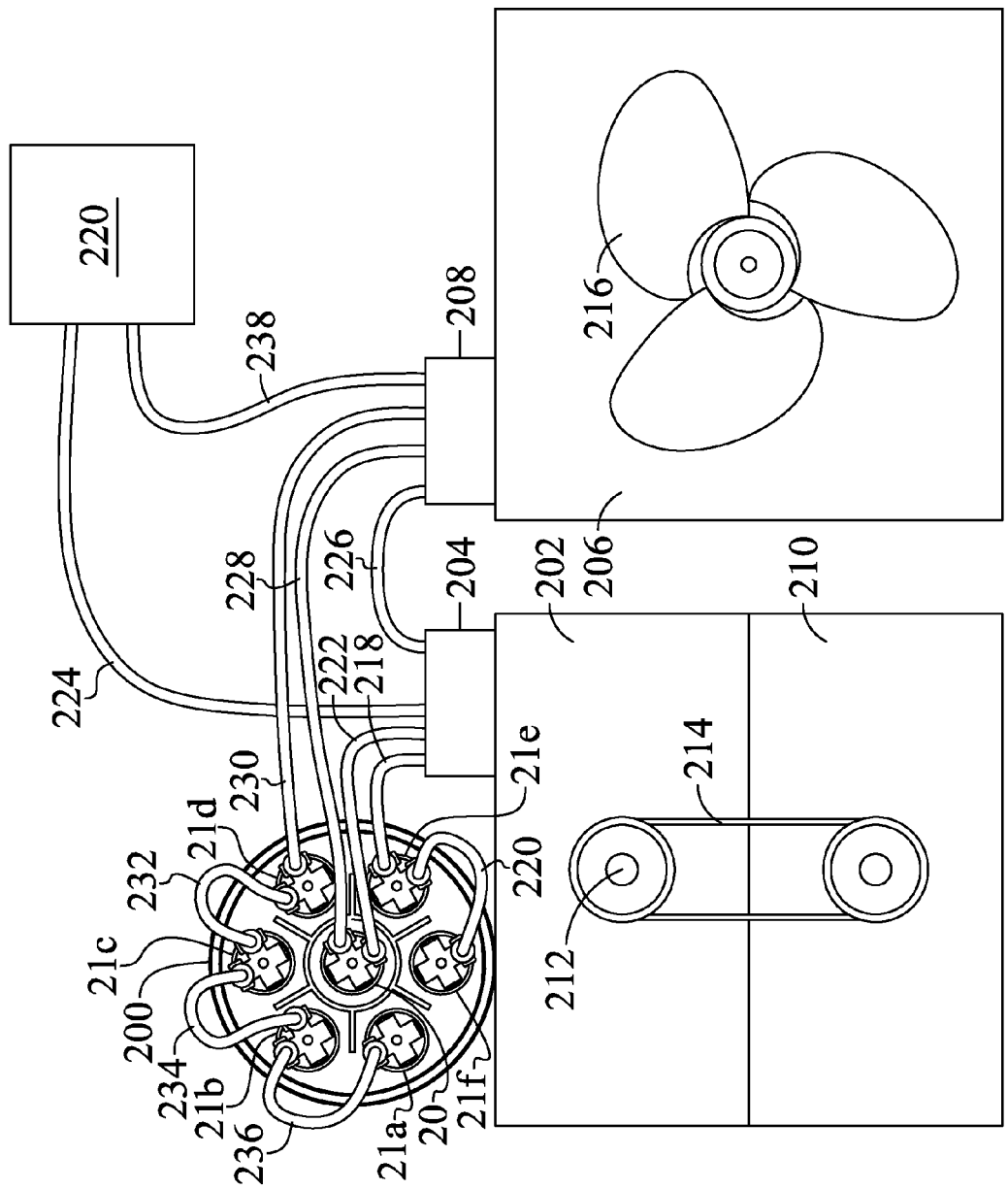
FIG. 8 is a schematic view of a bundled capacitor connected in parallel to at least two single phase motors.

FIG. 8 illustrates the bundled capacitor 200 connected to two motors in parallel for providing selective capacitance to at least two single phase motors simultaneously, such as for an air conditioning application.

The bundled capacitor 200 can be connected to a first motor 202 through a first connector block 204. A first wire 218 can connect the first connector block 204 to auxiliary terminal 21e. A second wire 220 can connect between auxiliary terminal 21e and auxiliary terminal 21f such that the auxiliary terminals 21e and 21f are connected in series. A third wire 222 can connect between the first connector block 204 and the central common terminal 20. A fourth wire 224 can connect between the first connector block 204 and a power supply 220.

The first motor 202 can be in communication with a compressor 210 through a pulley 212 and a belt 214.

The bundled capacitor 200 can also be connected to a second motor 206 through a second connector block 208. The second motor 206 can be a motor for circulating a box fan 216.

A fifth wire 226 can connect between the first connector block 204 and the second connector block 208.

A sixth wire 228 can connect between the second connector block 208 and the central common terminal 20. A seventh wire 230 can connect between the second connector block 208 and auxiliary terminal 21d.

An eighth wire 232, a ninth wire 234, and a tenth wire 236 can connect between auxiliary terminals 21d, 21c, 21b, and 21a such that the auxiliary terminals are connected in series. An eleventh wire 238 can connect between the second connector block 208 and the power supply 220.

In the embodiment shown, the bundled capacitor 200 is illustrated connected to two motors. However, the bundle capacitor can be connected to more or less than two motors. The bundled capacitor can be connected to various types of single phase motors such as air conditioning unit motors, garage door motors, vacuum cleaner motors, or other single phase motors.

Figure 9A:
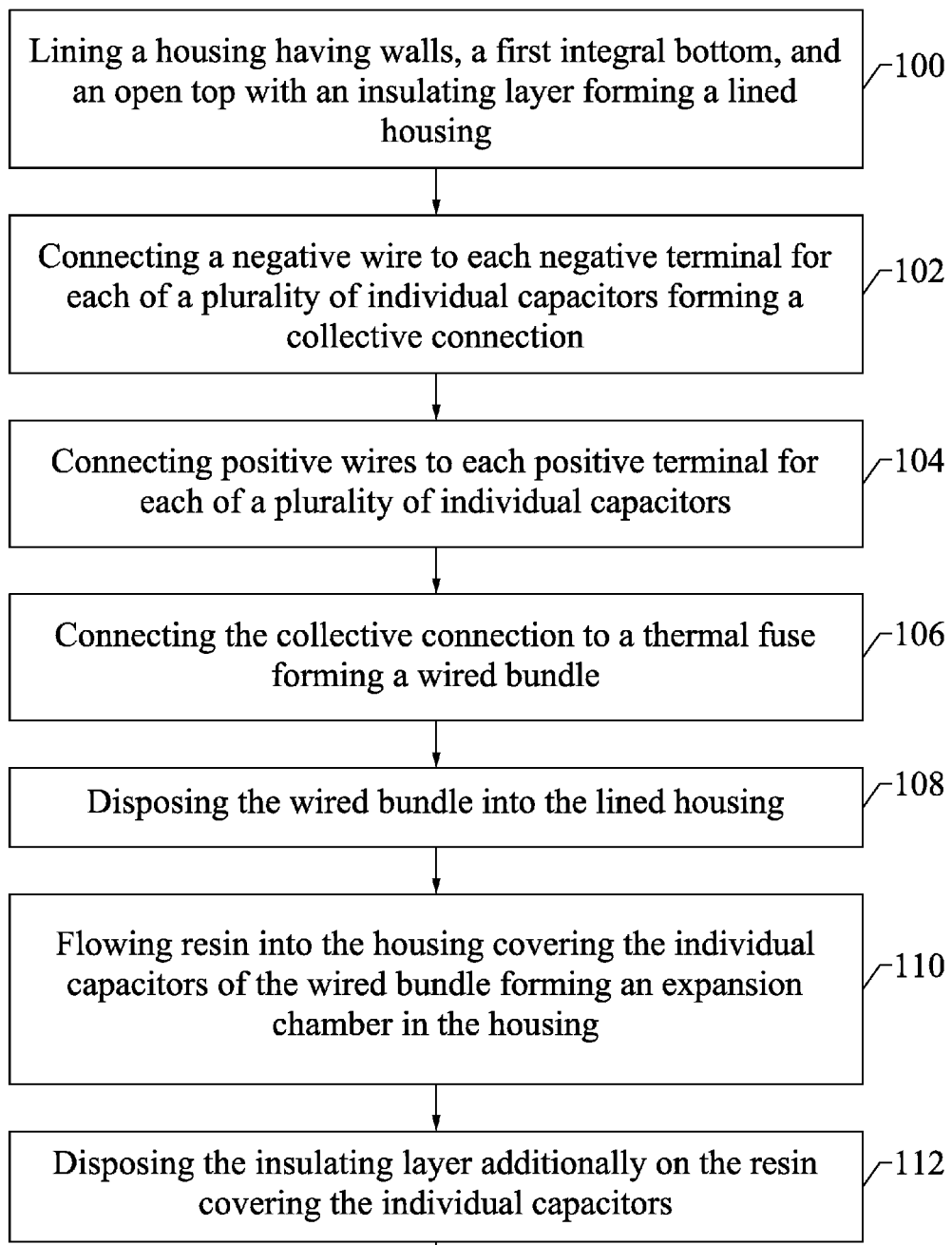
FIG. 9A depicts a flow chart of an embodiment of the method.

FIGS. 9A-9C depict an embodiment of the method.

FIG. 9A shows a first step 100 that can include lining a housing having walls, a first integral bottom, and an open top with an insulating layer forming a lined housing.

A step 102 can include connecting a negative wire to each negative terminal for each of a plurality of individual capacitors forming a collective connection.

A step 104 can include connecting positive wires to each positive terminal for each of a plurality of individual capacitors.

A step 106 can include connecting the collective connection to a thermal fuse forming a wired bundle.

A step 108 can include disposing the wired bundle into the lined housing.

A step 110 can include flowing resin into the housing covering the individual capacitors of the wired bundle forming an expansion chamber in the housing.

A step 112 can include disposing the insulating layer additionally on the resin covering the individual capacitors.

FIG. 9B shows a continuation of the flow chart shown in FIG. 9A.

A step 114 can include forming a plurality of terminals in a deformable cap by disposing a central common terminal in the cap and disposing a plurality of auxiliary terminals concentrically around the central common terminal, wherein each terminal has at least one blade to engage an electrical device.

A step 116 can include fastening an insulating spider with a tubular section and legs to the cap, wherein the tubular section separates the central common terminal from the plurality of auxiliary terminals, and wherein the legs separate each auxiliary terminal from adjacent auxiliary terminals.

A step 118 can include securing an interrupter to the cap opposite the insulating spider forming an insulated cap.

A step 120 can include connecting one of the positive wires to one of the auxiliary terminals forming an auxiliary frangible connection for each auxiliary terminal and repeating the step until all positive wires engage an auxiliary terminal.

A step 122 can include connecting the thermal fuse to the central common terminal forming a central frangible connection.

FIG. 9C shows a continuation of the flow chart shown in FIG. 9B.

A step 124 can include placing an adhesive around the lip.

A step 126 can include deforming the lip around the lined housing for non-removeably securing the insulated cap to the lined housing, forming a bundled capacitor.

A step 128a can include connecting the individually rolled sandwich like capacitors individually to a load in parallel.

A step 128b can include connecting the individually rolled sandwich like capacitors in series to create a larger capacitance value.

A step 130 can include operating a plurality of loads from at least one of the individually rolled sandwich like capacitors.

While these embodiments have been described with emphasis on the embodiments, it should be understood that within the scope of the appended claims, the embodiments might be practiced other than as specifically described herein.

What is claimed is:

1. A method for generating a multiplicity of capacitance values comprising:
   a. forming a lined housing, wherein the lined housing comprises an insulating layer lining disposed within a housing, wherein the insulating layer covers walls and a first integral bottom of the housing, and wherein the housing comprises an open top;
   b. connecting a negative wire to each negative terminal of each capacitor of a plurality of capacitors to form a collective connection, wherein the capacitors are located within the lined housing and a space is formed between the insulating layer and the capacitors;
   c. connecting a positive wire to each positive terminal of each capacitor of the plurality of individual capacitors;
   d. connecting the collective connection to a thermal fuse, forming a wired bundle;
   e. disposing the wired bundle within the lined housing;
   f. flowing a resin into the lined housing to cover the plurality of capacitors of the wired bundle with the resin, which form an expansion chamber in the lined housing;
   g. disposing the insulating layer on the resin to cover the plurality of capacitors;
   h. disposing a central common terminal within a cap and concentrically disposing a plurality of auxiliary terminals within the cap around the central common terminal, wherein each auxiliary terminal has at least one blade for engaging an electrical device, and wherein each central common terminal has at least one blade for engaging an electrical device;
   i. fastening an insulating spider with a tubular section and legs to the cap, wherein the tubular section separates the central common terminal from the plurality of auxiliary terminals, and wherein the legs separate each auxiliary terminal from adjacent auxiliary terminal of the plurality of auxiliary terminals;
   j. securing an interrupter to the cap opposite the insulating spider to form an insulated cap;
   k. connecting each positive wire to one auxiliary terminal of the plurality of auxiliary terminals to form an auxiliary frangible connection;
   l. connecting the thermal fuse to the central common terminal to form a central frangible connection;
   m. placing an adhesive around a lip of the insulated cap; and
   n. deforming the lip around the lined housing for non-removably securing the insulated cap to the lined housing to form a bundled capacitor.

2. The method of claim 1 further comprising using a plurality of individual capacitors, wherein each individual capacitor has a different selective capacitance value.

3. The method of claim 1, further comprising using at least two individual capacitors that have identical selective capacitance values.

4. The method of claim 1, further comprising connecting the plurality of individual capacitors in parallel to a load.

5. The method of claim 1, further comprising connecting the plurality of individual capacitors in series to a load to produce a larger capacitance value.

6. The method of claim 1, further comprising simultaneously operating a plurality of loads from at least one capacitor of the plurality of capacitors.

7. The method of claim 1, further comprising providing electrical communication between a motor and the bundled capacitor.

8. The method of claim 7, further comprising providing electrical communication between a power supply and the motor.

9. The method of claim 7, wherein the motor is in electrical communication with the central common terminal and at least one auxiliary terminal of the plurality of auxiliary terminals.

10. The method of claim 9, further comprising providing electrical communication between the at least one of the plurality of auxiliary terminals and another of the plurality of auxiliary terminals in series.

* * * * *